US006782654B1

(12) United States Patent
Borchardt

(10) Patent No.: US 6,782,654 B1
(45) Date of Patent: Aug. 31, 2004

(54) FISHING LURE HOLDERS AND METHODS

(76) Inventor: Terry Borchardt, 233 NW. Hickory, Lee's Summit, MO (US) 64064

(*) Notice: Subject to any disclaimer, the term of this patent is extended or adjusted under 35 U.S.C. 154(b) by 0 days.

(21) Appl. No.: 10/449,441

(22) Filed: May 30, 2003

Related U.S. Application Data
(60) Provisional application No. 60/389,154, filed on Jun. 14, 2002.

(51) Int. Cl.[7] ............................................. A01K 97/06
(52) U.S. Cl. .......................... 43/54.1; 43/57.1; 24/306; 24/448; 24/DIG. 11; 248/205.2; 248/205.3; 211/13.1; 211/89.01
(58) Field of Search ................................. 43/54.1, 57.1, 43/25.2; 206/315.11; 224/920; 24/306, 442, 304, DIG. 11, 444, 448; 211/70.6, 87.01, 85.2, 89.01, 13.1; 248/205.2, 205.3, 205.4

(56) References Cited

U.S. PATENT DOCUMENTS

| | | | | |
|---|---|---|---|---|
| 2,379,934 A | * | 7/1945 | Seiferth ....................... 206/443 |
| 2,486,593 A | * | 11/1949 | Gardner ................... 248/205.2 |
| 3,162,920 A | * | 12/1964 | Durham ................. 24/DIG. 11 |
| 3,334,736 A | * | 8/1967 | Mac Cole et al. ............ 24/306 |
| 3,542,321 A | * | 11/1970 | Kahabka ................... 248/205.3 |
| 3,940,873 A | * | 3/1976 | Lawless ....................... 43/57.1 |
| 4,008,871 A | * | 2/1977 | Rex ......................... 248/205.3 |
| 4,081,116 A | * | 3/1978 | Fliegelman et al. ......... 43/57.1 |
| 4,094,021 A | * | 6/1978 | Rapp ........................... 24/306 |
| 4,122,857 A | * | 10/1978 | Haerr ....................... 248/205.3 |
| 4,300,692 A | * | 11/1981 | Moreno ................... 211/87.01 |
| 4,327,837 A | * | 5/1982 | Ross ....................... 248/205.2 |
| 4,358,081 A | * | 11/1982 | Notoya ......................... 24/442 |
| 4,418,490 A | * | 12/1983 | Ancona ...................... 43/25.2 |
| 4,498,615 A | * | 2/1985 | Johnson ........................ 24/444 |
| 4,691,469 A | * | 9/1987 | Alsobrook et al. .......... 43/54.1 |
| 4,703,581 A | * | 11/1987 | Whittier ..................... 43/57.1 |
| 4,706,914 A | * | 11/1987 | Ground ................... 248/205.3 |
| 4,799,587 A | * | 1/1989 | Desanto ................... 248/205.2 |
| 4,970,821 A | * | 11/1990 | Young ........................ 43/54.1 |
| 4,988,338 A | * | 1/1991 | Taylor et al. ............ 248/205.2 |
| 4,995,577 A | * | 2/1991 | Wood ..................... 248/205.3 |

(List continued on next page.)

FOREIGN PATENT DOCUMENTS

| | | | |
|---|---|---|---|
| EP | 417915 B1 | * | 3/1991 |
| JP | 10-191859 B1 | * | 7/1998 |
| JP | 2000-4743 B1 | * | 1/2000 |

(List continued on next page.)

Primary Examiner—Darren W. Ark
(74) Attorney, Agent, or Firm—Charles M. Kaplan

(57) ABSTRACT

This invention includes infinitely adjustable methods and fishing tackle using connected first and second or connected upper and lower strips of flexible material which have a portion of the strips fashioned as a closure such as with releasable interlocking hook and loop or pad closure material or other releasable fasteners and which are provided with a means for adhering the upper and lower strips to an object convenient to an angler such as by the use of an adhesive strip so that an angler can quickly capture and quickly release a number of fishing lures having many different shapes and sizes which have been prearranged by he angler for rapid use.

20 Claims, 3 Drawing Sheets

U.S. PATENT DOCUMENTS

| | | | | |
|---|---|---|---|---|
| 5,031,282 A | * | 7/1991 | Denaro | 24/306 |
| 5,082,111 A | * | 1/1992 | Corbitt et al. | 211/70.6 |
| 5,100,393 A | * | 3/1992 | Johnson | 24/306 |
| 5,123,197 A | * | 6/1992 | Gentry et al. | 43/54.1 |
| 5,131,180 A | * | 7/1992 | Ives | 43/25.2 |
| 5,142,743 A | * | 9/1992 | Hahn | 24/442 |
| 5,214,874 A | * | 6/1993 | Faulkner | 43/25.2 |
| 5,242,063 A | * | 9/1993 | Ericksen et al. | 248/205.2 |
| 5,454,185 A | * | 10/1995 | Love | 43/57.1 |
| 5,551,657 A | * | 9/1996 | Liethen | 248/205.2 |
| 5,595,014 A | * | 1/1997 | Moore | 43/54.1 |
| 5,598,658 A | * | 2/1997 | Walker | 43/25.2 |
| 5,657,862 A | * | 8/1997 | Burke | 248/205.2 |
| 5,671,849 A | * | 9/1997 | Bacon | 211/85.2 |
| 5,691,026 A | * | 11/1997 | Zinke et al. | 24/306 |
| 5,806,236 A | * | 9/1998 | Lloyd | 43/57.1 |
| 5,827,589 A | * | 10/1998 | Autterson | 24/306 |
| 5,870,849 A | * | 2/1999 | Colson, Jr. | 43/25.2 |
| 5,924,662 A | * | 7/1999 | Monty | 248/205.2 |
| 6,065,242 A | * | 5/2000 | Weder | 248/205.3 |
| 6,370,810 B1 | * | 4/2002 | Widerman | 43/54.1 |
| 6,449,816 B1 | * | 9/2002 | Dudek et al. | 24/306 |
| 6,581,885 B2 | * | 6/2003 | Polad | 248/205.3 |
| 6,601,335 B1 | * | 8/2003 | Brumfield | 43/25.2 |
| 6,641,096 B2 | * | 11/2003 | Johansson et al. | 248/205.3 |
| 6,675,449 B2 | * | 1/2004 | Wales | 24/304 |

FOREIGN PATENT DOCUMENTS

| | | | |
|---|---|---|---|
| JP | 2000-37154 B1 | * | 2/2000 |
| JP | 2001-231421 B1 | * | 8/2001 |
| JP | 2001-321051 B1 | * | 11/2001 |
| JP | 2001-333680 B1 | * | 12/2001 |
| JP | 2002-153186 B1 | * | 5/2002 |
| JP | 2003-204746 B1 | * | 7/2003 |

* cited by examiner

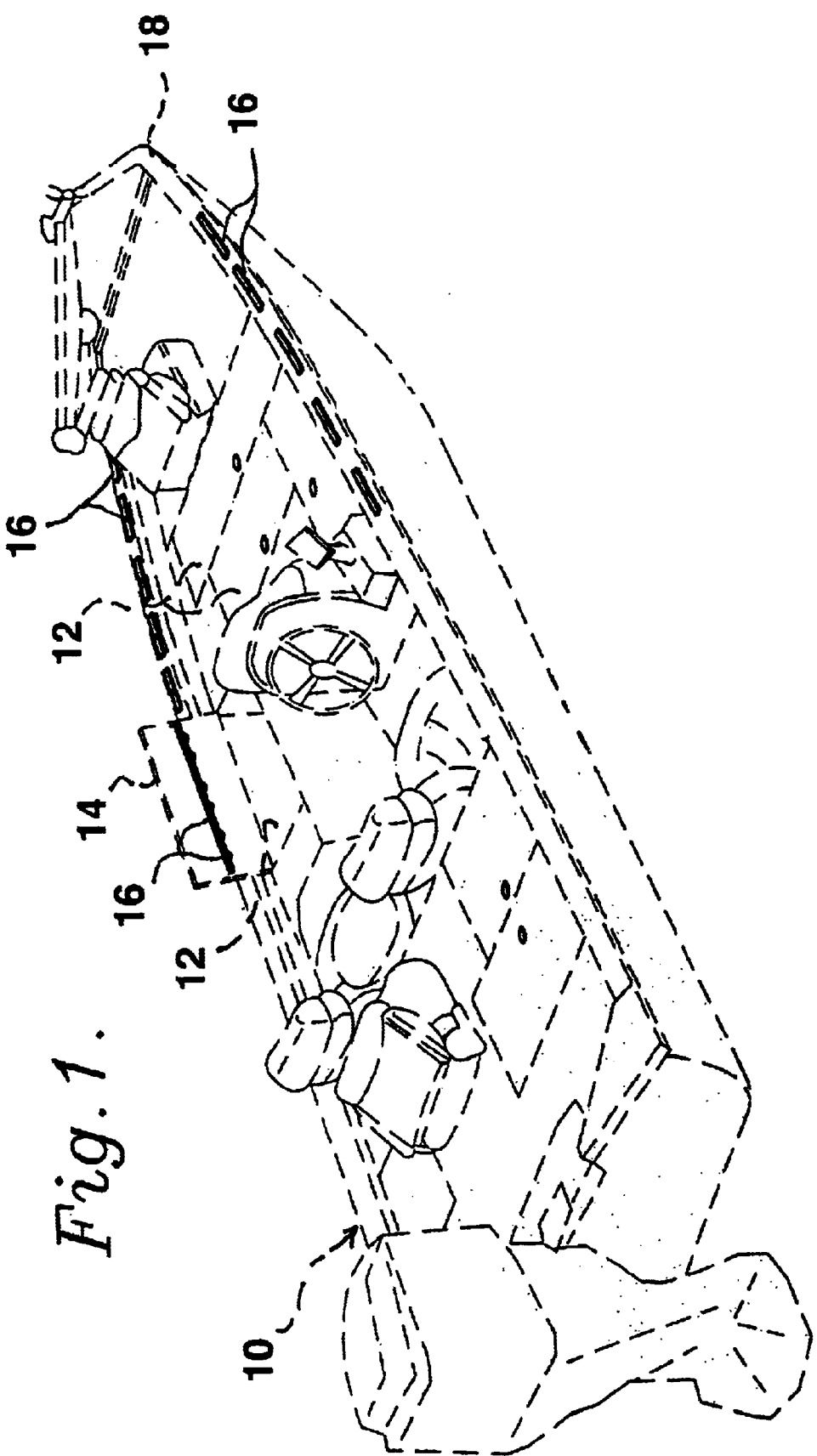

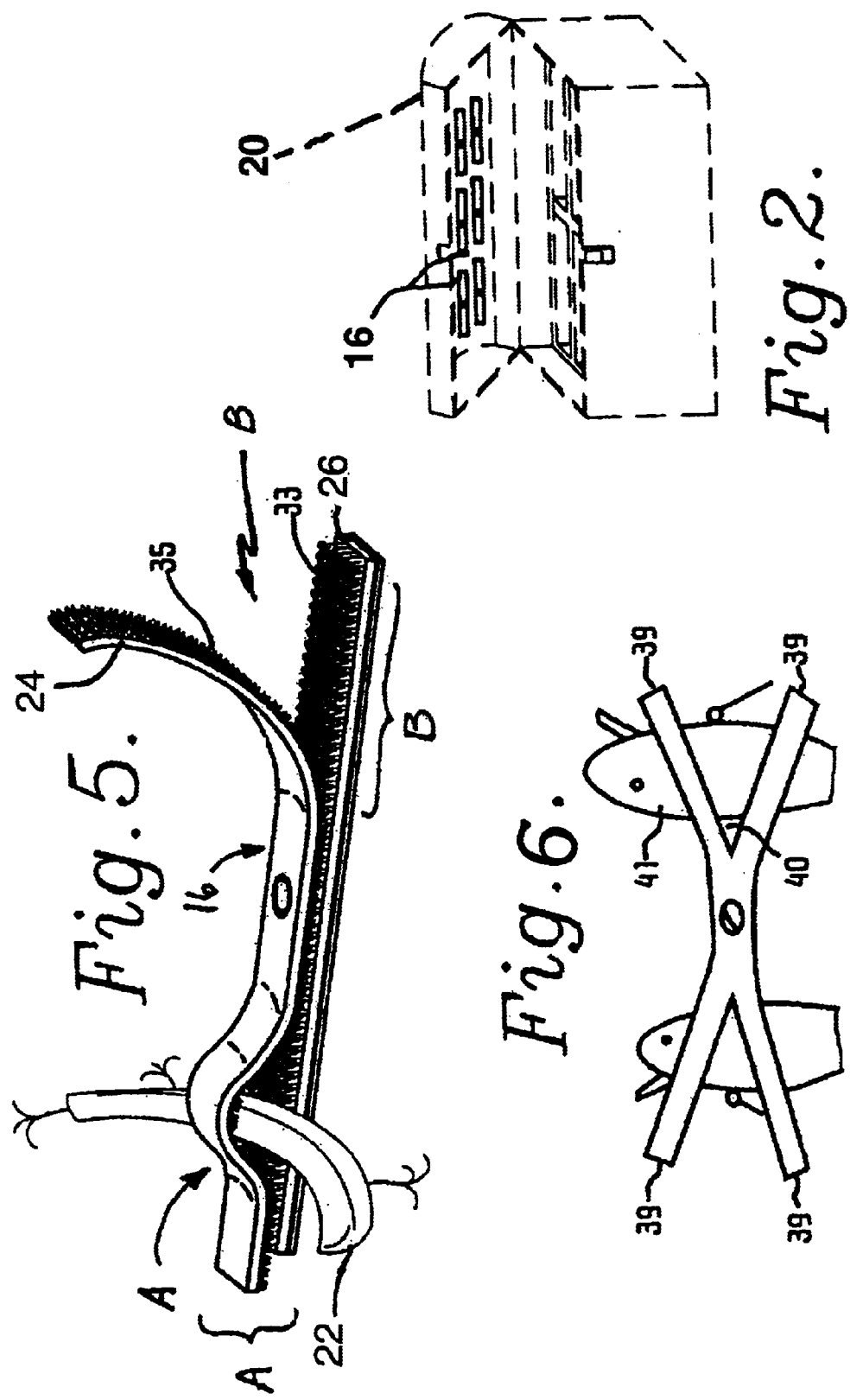

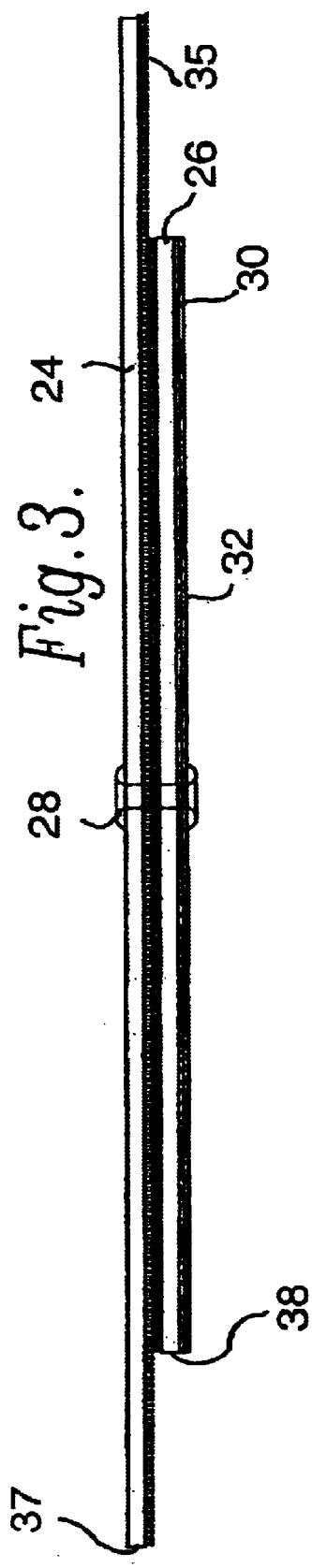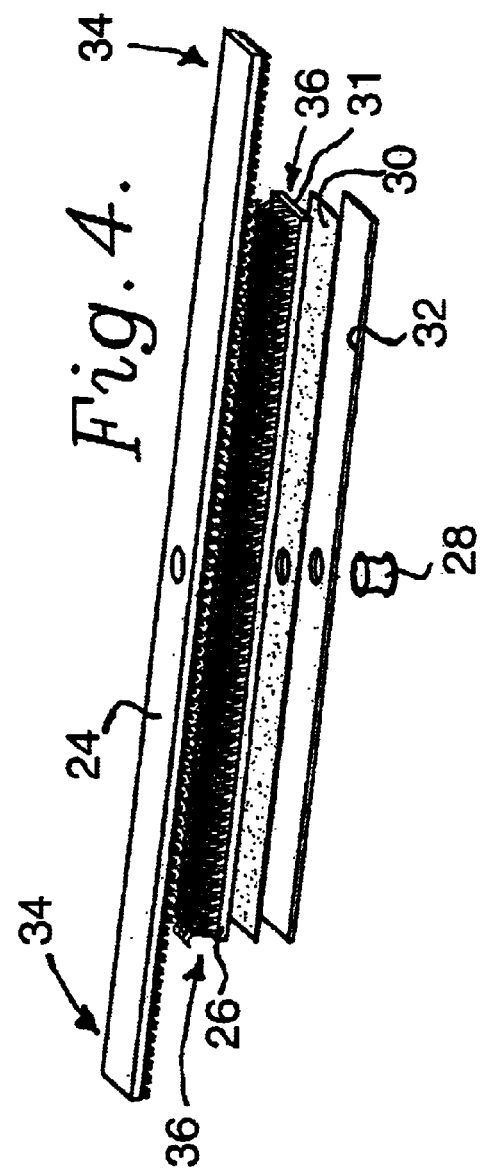

FISHING LURE HOLDERS AND METHODS

This application is entitled to the date and benefit of U.S. Provisional Patent Application Ser. No. 60/389,154, which was filed on Jun. 14, 2002.

BACKGROUND OF THE INVENTION

This invention relates to holders for and methods of holding fishing lures. In particular, the present invention relates to a fishing lure holder and method which can be positioned at any location on a fishing boat or on a fishing tackle box or on a person's clothing and which provides quick capture and quick release of the lure for storage and for use.

During competitive fishing, the angler is under a time limit to catch fish of a particular type from a selected lake or area of a body of water. In responding to changing weather conditions, water temperature, water conditions, time of day, fish depth and fish feeding habits, it is necessary for the competitive angler to make rapid decisions regarding the type of lure being used. It is also necessary for the angler to rapidly switch between lures in order to minimize the time devoted to tackle preparation and changing from one lure to another.

Prior to the start of competition, the competitive angler will have previously identified for use lures that are particularly suited to the type of fish sought and various fishing variables such as water temperature, feeding habits, and fish depth being confronted. Further, lures which simulate bait that is popular with the particular fish species of competition interest that simulate a particular insect will be identified for use. The competitive angler will want the various lures immediately and quickly available. The object being that they may be grasped and switched for the previously used lure at a moment's notice and without the need to hunt through various tackle boxes or areas of the boat to locate them.

Presently the competitive angler is faced with a number of problems in rapidly switching from one lure to another. When fishing from a boat, the angler is on a pitching and rolling platform which will, to some degree, affect the angler's mobility. The option of having a series of preselected lures readily available and which are secured in a convenient location by an easily release capture device will assist the angler retrieving the lure, switching the new lure for the old lure, and securing the old lure at a location where it is available for future use.

Another difficulty faced by the competitive angler is the wide variety of lures which the serious competitive angler will have collected during the years. Each lure will be best suited to a particular species of fish and/or a particular type of fishing condition. The competitive angler will wish to avoid sorting through this vast array of lures during competition. Therefore, it is desirable to have identified a preselected set of lures which can be mounted at convenient locations on a boat, or on a tackle box or on the angler's clothing so that the set of lure which is most applicable to the species of fish and fishing conditions are quickly averrable for use.

OBJECTIVES OF THE INVENTION

The present invention solves these problems and achieves the indicated objectives by presenting the angler with adjustable fishing lure holders and methods of holding lures in quick release and quick capture fashion of a number of fishing lures having many different shapes which have been prearranged by he angler for rapid use during competitive fishing tournaments.

A further object is to provide fishing lure holders that are lightweight, durable, economical, attractive, easy to use, and which do not possess defects found in similar prior art fishing tackle.

A further object is to provide improved methods for temporarily storing fishing lures with easy access to the lures.

Other objects and advantages of the fishing lure holders and methods incorporating this invention will be found in the specification and claims and the scope of the invention will be set forth in the claims.

DESCRIPTION OF THE DRAWING

FIG. 1 is a perspective view of a typical competitive fishing boat showing the boat in phantom lines with the present invention attached thereto;

FIG. 2 is a perspective view of a portable tackle box with the tackle box shown on phantom lines and the present invention shown fixed to the interior lid of the tackle box.

FIG. 3 is a front, elevation view of the present invention showing the layers of the present invention fixed together by a center rivet.

FIG. 4 is a is a top and front exploded perspective view of the invention showing the layers of the invention;

FIG. 5 is a top and front perspective view of the invention showing a fishing lure captured in a first side and a second side open for insertion of another lure therein, and FIG. 6 is a schematic side view of another embodiment of the invention.

DESCRIPTION OF THE INVENTION

The invention is suited to use in several different environments as shown in FIGS. 1 and 2. In FIG. 1, a typical competitive bass fishing boat 10 is shown, the deck of which is equipped with various storage bins 12 having bin lids 14 attached thereto. The fishing lure holder 16 can be attached to an unobstructed area on the inside of the lids 14 of storage bins 12. Such storage on the inside of bin lids 14 would be for a longer term type of storage but available for immediate access and use. Alternately, an angler may wish to remove particular lures from their longer term location attached to storage bin 14 and place them in an alternative location for short term use, such as by positioning the lures within a holder 16 that has been attached to smooth, flat unobstructed areas on gunwale 18 of boat 10. A plurality of holders 16 may be placed along gunwale 16 around the entirety of boat 10 or merely in several positions of highest use. One advantage of repositioning selected lures in holders 16 placed along gunwales 18 is that if the particular storage bin 12 in which lures are kept is not convenient to the area of the boat from which fishing takes place, the selected lures can be easily removed from within the holder 16 on the bin lid 14 and quickly repositioned into holders 16 which have been prepositioned along gunwale 18. In this manner, an angler can have the option of radially moving a number of lures to a particular position on an otherwise unused surface of boat 10 from which fishing activity will occur and thereby avoid the need to stay near the particular boat storage bin 12 in which the particular lures are stored on a long term basis.

An alternative way of using holders 16 is shown in FIG. 2 in which holders 16 have been secured to an unobstructed surface in the inside of a portable tackle box 20. This allows the angler to retain the rapid lure change out capability of the invention while being able to switch between dock fishing or boat fishing and the use of different boats on short notice.

Referring now to FIGS. 3–5, the construction of the present invention will be described in detail. Holder 16 is an integral unit comprised of several layers or strips that are releasably connectable to each other by mating releasable fastener means, and which are secured together by rivet 28. First or bottom flexible strip 26 has double sided adhesive member 30 applied to its bottom side 31. Releasable strip 32 is on the bottom side of adhesive member 30 to protect the adhesive side of the member 30 prior to bonding of the holder 16 to a location where it is used. Rivet 28 secures a top or second strip 24 of flexible material to an opposite side 33 of first strip 26. Second strip 24 has unattached portions 35 that are movable away from opposite side 33 of the first strip a distance sufficient to receive fishing lures therebetween. Rivet 28 may pass through the center of the layers forming holder 16. When an angler decides to apply holder 16 to a fishing lure supporting surface at a particular location, releasable strip 32 is peeled away from double sided adhesive 30 thus exposing one of the adhesive sides of strip 30 to allow bonding of the side 31 of first strip 26 of holder 16 to the selected object at an unobstructed surface area that is larger than the area of the strip 26. The terminal ends 37 of strip 24 may extend beyond the terminal ends 38 of strip 26.

Side 33 of first strip 26 may comprise a loop or pad material that mates and interlocks with hook material on the unattached portions 35 of second strip 24 of the type sold under the brand name VELCRO®. Alternatives to the releasable hook and loop closure strips may be a reusable adhesive portion or a closure such as a snap fastener or a connector device having a ball for insertion into a detent opening.

In FIG. 5, quick capture and release lure holder 16 is shown with an artificial lure 22 captured on side A of the holder and with side B of the holder open and available for insertion of another lure therein. To capture a lure 22 in side B of holder 16, an unattached portion 35 of second strip 24 has been moved away from first strip 26 a distance greater than some dimension of the lure, as generally shown in FIG. 5. Then the lure will be put into the opening or space between strips 24 and 26, and strip 24 moved back into contact with the lure pressing the lure into tight contact with strip 26. Finally, the strip 24 would be tightened against the lure 22 and pressed against the strip 26 so as to engage and interlock the releasable fastener hook and loop connectors on the mating strips.

FIG. 5 shows the invention detached from the places of usage shown in FIGS. 1 and 2 in which holder 16 is normally secured to an unobstructed surface or face of a solid or fixed structure. The ease with which holder 16 is attachable to a location convenient to an angler makes the holder amenable for attachment to the fishing vest or hat of an angler or to other clothing or portable equipment or tackle for quick capture and release of selected lures. For example, if an angler is walking down a shoreline and does not wish to carry a tackle box or other container for lures, the invention could be adhered to a fishing vest or other piece of clothing or to another piece of equipment which the angler is carrying.

FIG. 6. shows another embodiment of the invention that may be used to securely hold crankbaits or other lures with irregular surfaces on a hard surface such as the gunwale 18. The strips of flexible material 24 and 26 and the adhesive strip 30 have been bifurcated on each side of the rivet 28 by cutting them apart with a scissors or razor. This produces a relatively thinner forked pair of strips 39 separated by an acute angle 40 on each side of the rivet. The separated strips 39 can be used to contact a lure 41 at spaced locations on the lure, which will hold the lure in place when rough water is encountered.

The disclosed embodiment of holder 16 which employs hook and loop releasable fasteners for securing a lure 22 or 40 may be modified to provide alternative embodiments. For example, the hook and loop portions need not extend entirely across the strips 24 and 26, but may be located only at the ends of the strips to secure only end portions 34 of strip 24 to end portions 36 of strip 26. In the case where the hook and loop material is restricted to end portions 34 and 36, a plain or an elastic rough material can be used to make up the rest of the area of strips 24 and 26 to provide frictional capture of lure 22 or 40 therebetween.

The practice of this invention also includes methods of temporarily attaching an artificial fishing lure 22 or 40 to an unobstructed surface such as 14 or 18 from which the lure can be quickly removed for use by an angler. A method may be practiced by affixing adhesive 30 to one side 31 of a first strip 26 of flexible material, and attaching a portion of a second strip 24 of flexible material to an opposite side 33 of the first strip in such a manner that an unattached portion 35 of the second strip is movable with respect to the first strip. The adhesive 30 may be used to adhere the one side 31 of the first strip to a surface like 14 or 18. The unattached portion 35 of the second strip 24 is moved away from the opposite side 33 of the first strip to provide a space that is larger than the lure that is being attached. The lure is inserted into that space, and it is captured in the space by moving the unattached portion 35 of the second strip into contact with the lure so as to bind the lure against the opposite side 33 of the first strip. The lure can then be temporarily held on the selected surface by temporarily affixing the unattached portion 35 of the second strip to the opposite side 33.

Additional advantages of the methods of this invention may be achieved by attaching the second strip 24 to the first strip 26 adjacent the center of the first strip, or by extending a terminal end 37 of the second strip beyond a terminal end of the first strip. A double sided adhesive strip 30 may be affixed to one side 31 of the first strip to facilitate bonding of the holder 16 to the selected surface. Releasable fastener means may be employed by applying mating hook and loop materials to the opposite side 33 of the first strip and to the unattached portion 35 of the second strip to enable the temporary affixing of the unattached portion of the second strip to the opposite side of the first strip.

While the present invention has been described with reference to particular embodiments and methods, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

I claim:

1. A fishing lure holder for temporarily supporting a fishing lure on a surface from which the lure can be quickly removed; said fishing lure holder comprising: a first strip of flexible material having opposed first and second surfaces, an adhesive on said first surface, a second strip of flexible material, means permanently securing a portion of said second strip adjacent its center to the second surface of said first strip adjacent its center, unattached portions of said second strip located on opposite sides of its secured portion being movable toward and away from said second surface of said first strip, each of the movable unattached portions of said second strip being movable away from said first strip by a distance sufficient to enable insertion of a fishing lure between such unattached portion and said first strip on the opposite sides of said secured portion of said second strip, mating releasable fasteners on said first and second strips for temporarily connecting said second surface of said first strip and said unattached portions of said second strip in such a manner that fishing lures encompassed between said first and second strips on opposite sides of the permanently secured portions are temporarily supported there between on any surface to which said adhesive bonds said first strip.

2. The fishing lure holder for temporarily supporting a fishing lure on a surface from which the lure can be quickly removed defined in claim 1, wherein a terminal end of said second strip extends beyond a terminal end of said first strip.

3. The fishing lure holder for temporarily supporting a fishing lure on a surface from which the lure can be quickly removed defined in claim 1, wherein said adhesive comprises a double sided adhesive strip which is affixed to said first surface of said first strip.

4. The fishing lure holder for temporarily supporting a fishing lure on a surface from which the lure can be quickly removed defined in claim 1, wherein said releasable fasteners comprise mating hook and loop materials applied to said second surface of said first strip and said unattached portions of said second strip.

5. The fishing lure holder for temporarily supporting a fishing lure on a surface from which the lure can be quickly removed defined in claim 1, wherein a terminal end of said second strip extends beyond a terminal end of said first strip said adhesive comprises, a double sided adhesive strip which is affixed to said first surface of said first strip, and said releasable fasteners comprise mating hook and loop materials applied to said second surface of said first strip and said unattached portion of said second strip.

6. The fishing lure holder for temporarily supporting a fishing lure on a surface from which the lure can be quickly removed defined in claim 1, further comprising said first and second strips each being bifurcated at the same place into a pair of relatively thin mating forked strips that are separated by an acute angle so as to contact and support a fishing lure at spaced locations on the lure.

7. The fishing lure holder for temporarily supporting a fishing lure on a surface from which the lure can be quickly removed defined in claim 1, wherein opposite terminal ends of said second strip extend beyond corresponding terminal ends of said first strip.

8. A combination comprising a fishing lure, a fishing lure supporting surface, and a releasable fishing lure holder temporarily attaching the fishing lure to said supporting surface, said combination comprising:

said releasable fishing lure holder comprising a first strip of flexible material having an adhesive on one side thereof, a second strip of flexible material, means attaching said second strip to an opposite side of said first strip, a portion of said second strip being unattached to said first strip and being movable toward and away from said first strip, mating releasable fasteners on said first and second strips for temporarily connecting said unattached portion of said second strip to said opposite side of said first strip;

said supporting surface having a face with an unobstructed area larger than said one side of said first strip, said adhesive bonding said one side of said first strip to said unobstructed area;

said unattached portion of said second strip being separated from said opposite side of said first strip so as to define a space there between in which said fishing lure is held, said fishing lure being in contact with both said first and second strips, and said mating releasable fasteners being engaged so as to bind said fishing lure therebetween and to temporarily hold said fishing lure on said supporting surface until the fasteners are released.

9. The combination comprising a fishing lure, a fishing lure supporting surface, and a releasable fishing lure holder temporarily attaching the fishing lure to said supporting surface defined in claim 8, wherein said second strip is attached to said first strip adjacent the center of said first strip.

10. The combination comprising a fishing lure, a fishing lure supporting surface, and a releasable fishing lure holder temporarily attaching the fishing lure to said supporting surface defined in claim 8, wherein a terminal end of said second strip extends beyond a terminal end of said first strip.

11. The combination comprising a fishing lure, a fishing lure supporting surface, and a releasable fishing lure holder temporarily attaching the fishing lure to said supporting surface defined in claim 8, wherein said adhesive comprises a double sided adhesive strip which is affixed to said one side of said first strip.

12. The combination comprising a fishing lure, a fishing lure supporting surface, and a releasable fishing lure holder temporarily attaching the fishing lure to said supporting surface defined in claim 8, wherein said releasable fasteners comprise mating hook and loop materials applied to said opposite side of said first strip and to said unattached portion of said second strip.

13. The combination comprising a fishing lure, a fishing lure supporting surface, and a releasable fishing lure holder temporarily attaching the fishing lure to said supporting surface defined in claim 8, wherein said second strip is attached to said first strip adjacent the center of said first strip, a terminal end of said second strip said adhesive comprises extends beyond a terminal end of said first strip, a double sided adhesive strip which is affixed to said one side of said first strip, and said releasable fasteners comprise mating hook and loop materials applied to said opposite side of said first strip and to said unattached portion of said second strip.

14. The combination comprising a fishing lure, a fishing lure supporting surface, and a releasable fishing lure holder temporarily attaching the fishing lure to said supporting surface defined in claim 8, further comprising said first and second strips each being bifurcated into a pair of relatively thin mating forked strips that are separated by an acute angle, said forked strips contacting and supporting the fishing lure at spaced locations on the lure.

15. A method of temporarily attaching an artificial fishing lure to a surface from which said lure can be quickly removed, said method comprising the following steps:

affixing adhesive to one side of a first strip of flexible material;

attaching a portion of a second strip of flexible material to an opposite side of said first strip in such a manner that an unattached portion of said second strip is movable with respect to said first strip;

using said adhesive to adhere said one side of said first strip to said surface;

moving said unattached portion of said second strip away from said opposite side of said first strip to provide a space larger than said lure;

inserting said lure into said space;

capturing said lure in said space by moving said unattached portion of said second strip Into contact with said lure so as to bind said lure against said opposite side of said first strip; and temporarily affixing said unattached portion of said second strip to said opposite side of said first strip so as to hold said lure on said surface.

16. The method of temporarily attaching an artificial fishing lure to a surface from which said lure can be quickly removed defined in claim 15, further comprising attaching said second strip to said first strip adjacent the center of said first strip.

17. The method of temporarily attaching an artificial fishing lure to a surface from which said lure can be quickly removed defined in claim 15, further comprising extending a terminal end of said second strip beyond a terminal end of said first strip.

18. The method of temporarily attaching an artificial fishing lure to a surface from which said lure can be quickly removed defined in claim 15, wherein the affixing of adhesive further comprising affixing a double sided adhesive strip to said one side of said first strip.

19. The method of temporarily attaching an artificial fishing lure to a surface from which said lure can be quickly removed defined in claim 15, further comprising applying mating hook and loop materials to said opposite side of said first strip and said unattached portion of said second strip to enable the temporary affixing of said unattached portion of said second strip to said opposite side of said first strip.

20. The method of temporarily attaching an artificial fishing lure to a surface from which said lure can be quickly removed defined in claim 15, further comprising attaching said second strip to said first strip adjacent the center of said first strip, extending a terminal end of said second strip beyond a terminal end of said first strip, the affixing of adhesive comprising affixing a double sided adhesive strip to said one side of said first strip, and applying mating hook and loop materials to said opposite side of said first strip and said unattached portion of said second strip to enable the temporary affixing of said unattached portion of said second strip to said opposite side of said first strip.

* * * * *